United States Patent
Kondo et al.

(10) Patent No.: US 8,210,033 B2
(45) Date of Patent: Jul. 3, 2012

(54) DEVICES FOR DETECTING ACCUMULATION AMOUNT OF PARTICULATES

(75) Inventors: Jungo Kondo, Nishikamo-Gun (JP); Keiji Matsuhiro, Nagoya (JP); Kenji Aoki, Nagoya (JP); Atsuo Kondo, Okazaki (JP)

(73) Assignee: NGK Insulators, Ltd., Nagoya (JP)

( * ) Notice: Subject to any disclaimer, the term of this patent is extended or adjusted under 35 U.S.C. 154(b) by 130 days.

(21) Appl. No.: 12/721,797

(22) Filed: Mar. 11, 2010

(65) Prior Publication Data

US 2010/0242441 A1    Sep. 30, 2010

(30) Foreign Application Priority Data

Mar. 25, 2009 (JP) ................... 2009-073688
Jan. 13, 2010 (JP) ................... 2010-004905

(51) Int. Cl.
*G01M 15/10* (2006.01)
(52) U.S. Cl. .................. 73/114.69; 73/114.71
(58) Field of Classification Search ............. 73/23.33, 73/114.71, 114.69
See application file for complete search history.

(56) References Cited

U.S. PATENT DOCUMENTS

| | | | | |
|---|---|---|---|---|
| 4,477,771 A * | 10/1984 | Nagy et al. | .................. | 324/636 |
| 4,580,441 A | 4/1986 | Sakurai et al. | | |
| 5,157,340 A * | 10/1992 | Walton et al. | ................. | 324/641 |
| 7,677,031 B2 * | 3/2010 | Knitt | ................. | 60/295 |
| 7,679,374 B2 * | 3/2010 | Bromberg et al. | ............ | 324/637 |
| 2008/0059093 A1 * | 3/2008 | Bromberg et al. | ............. | 702/76 |
| 2010/0242442 A1 * | 9/2010 | Kondo et al. | .................. | 60/277 |
| 2010/0269567 A1 * | 10/2010 | Kondo et al. | ................ | 73/23.33 |

FOREIGN PATENT DOCUMENTS

| EP | 1 764 626 A2 | 3/2007 |
|---|---|---|
| JP | 59-204747 A1 | 11/1984 |
| JP | 2007-079466 A1 | 3/2007 |
| JP | 2009-002276 A1 | 1/2009 |
| JP | 2009-057948 A1 | 3/2009 |
| JP | 2009-250062 A1 | 10/2009 |
| WO | 2009/031600 A2 | 3/2009 |

OTHER PUBLICATIONS

U.S. Appl. No. 12/721,826, filed Mar. 11, 2010, Kondo, et al.
U.S. Appl. No. 12/721,892, filed Mar. 11, 2010, Kondo, et al.
Jeff Fortin, "Advanced DPF Soot Sensor," GE Sensing and Inspection Technologies, GE: International CTI Forum, Dec. 2-4.

* cited by examiner

*Primary Examiner* — Freddie Kirkland, III
(74) *Attorney, Agent, or Firm* — Burr & Brown (57) ABSTRACT

A device for detecting an accumulation amount of particulates is provided. The device has a filter for trapping particulates from a gas containing the particulates, a container for containing the filter, an upstream pipe provided on the upstream side of the container to lead the gas into the container, a downstream pipe provided on the downstream side of the container to lead the gas after passed through the filter, a transmitting antenna provided within the downstream pipe to transmit an electromagnetic wave having a frequency of 30 GHz or more but not exceeding 10 THz, and a receiving antenna provided within the upstream pipe to receive the electromagnetic wave. An amount of the particulates trapped in the filter is detected based on an intensity of the electromagnetic wave received by the receiving antenna.

5 Claims, 5 Drawing Sheets

DEVICES FOR DETECTING ACCUMULATION AMOUNT OF PARTICULATES

This application claims the benefit of Japanese Patent Applications P2009-73688 filed on Mar. 25, 2009, and P2010-4905 filed on Jan. 13, 2010, the entireties of which are incorporated by reference.

FIELD OF THE INVENTION

The present invention relates to a device for detecting an accumulation amount of particulates, which may be used for detection of PM accumulation amount in a filter disposed in an exhaust system of an internal combustion engine such as a diesel engine or the like.

BACKGROUND OF THE INVENTION

Toxic substances in the internal combustion engine, such as the diesel engine, are discharged as PM (particulate matter: soot composed of carbon fine particles, high-molecular weight hydrocarbon fine particles, sulfur-based fine particles such as sulfate, etc.). Since the Environmental Agency recently has considered deciding an environmental criterion with respect to fine particulates with particle size of 2.5 μm or less to more strictly regulate particulates, a development race has been performed to respond to the stricter regulations.

As an exhaust emission control system for diesel engine, a sealed type ceramic honeycomb body (diesel PM filter: DPF) is prevalent. The DPF has a ceramic honeycomb structure in which both ends of opening parts of cells are alternately sealed. That is, the DPF includes inflow-side cells sealed on exhaust gas downstream side, outflow-side cells sealed on exhaust gas upstream side, and a cell partition wall defining the inflow-side cells and the outflow-side cells, respectively. The particulates are trapped by passing exhaust gas through pores of the cell partition wall.

However, since accumulation of the particulates causes increase in pressure loss of exhaust gas in the DPF, the DPF must be regenerated by removing the accumulated particulates to suppress deterioration of output or fuel consumption in the internal combustion engine. Therefore, forced regeneration of the DPF is being performed by burning the accumulated PM, for example, according to the following process. That is, the temperature of exhaust gas is raised by adding a reducing agent, such as fuel, to the exhaust gas, the reducing agent is burned with an oxidation catalyst disposed on the upstream side of the DPF, and the resulting high-temperature exhaust gas is then supplied to the DPF.

However, when such a regeneration control is performed in a state where the particulates are trapped within the filter in an accumulation amount beyond a certain filter use limit value, cracking or melting loss of the filter is caused by localization of temperature or excessive rise of overall temperature of the filter resulting from the burning of PM. For preventing such a failure, prediction of accumulation amount of particulates within the filter is performed by measuring the pressure loss in the filter, an intake air quantity, an exhaust gas temperature, a fuel injection quantity, an EGR opening, an engine speed or the like and performing arithmetic processing thereto in ECU.

On the other hand, in the general internal combustion engine such as the diesel engine, a value is obtained by multiplying a safety ratio to this filter use limit value and then adopted as a regeneration control point. The point is generally represented by regeneration control point (g/L)=filter use limit value (g/L)×safe factor, wherein the safe factor is 0<safe factor<1. Accordingly, the regeneration control point is set so as to satisfy the relationship of regeneration control point (g/L)<filter use limit value (g/L).

This safety factor is differently set by each automobile maker, and is determined according to the completion rate of prediction technique for accumulation amount of particulates in the filter or the guideline for safety of each maker. As the safety factor is closer to 1, the filter regeneration becomes less frequent, so that the fuel efficiency is less deteriorated. Therefore, the accumulation amount of particulates in the filter needs to be accurately predicted.

When the accumulation amount of particulates is determined to reach the regeneration control point, the exhaust gas temperature is forcedly raised to perform the regeneration of the filter. A method therefor is described in Japanese Patent Application Laid-Open No. Sho 59-204747A. That is, a microwave transmitting antenna and a microwave receiving antenna are set respectively on opposed side walls of an exhaust gas conduit to measure a concentration of graphite distributing between the both.

Further, a method for detecting soot accumulated in DPF is described in "Advanced DPF soot sensor presented by GE: International CTI Forum 2-4 Dec", in which RF transmitting antenna and receiving antenna are set respectively at the inlet and outlet of a DPF container.

In Japanese Patent Application Laid-Open No. 2009-2276A, a transmitting antenna and a receiving antenna are mounted on a center part of an outer wall of a DPF filter so as to be opposed to each other. An electromagnetic wave of several tens GHz to several tens THz is transmitted from the transmitting antenna, passed through the filter, and received by the receiving antenna mounted on the opposite side. The accumulation amount of particulates to the filter is thereby calculated based on the receiving intensity of the electromagnetic wave.

SUMMARY OF THE INVENTION

However, in detection of the accumulation amount of particulates such as soot by use of microwave, absorption of carbon particles, main components of soot, is not large. In the GE soot sensor of "Advanced DPF soot sensor presented by GE: International CTI Forum 2-4 Dec", for example, although a dynamic range of about 15 dB is obtained by arithmetic processing such as average processing, sufficient sensitivity cannot be ensured in practice due to fluctuating parameters such as material or shape of DPF, exhaust gas pipe shape, particle size and particulate component.

Detection by use of a microwave also has the following problem. That is, it can be adapted only within an accumulation amount range of from 2 to 4 g/L, since the absorption sensitivity is deteriorated when soot is accumulated to some degree. Since the soot accumulation amount limit of DPF is generally 5 g/L or more, only an algorithm of performing regeneration processing in spite of the presence of a sufficient accumulation capacity is established. This is insufficient from the point of improvement in fuel efficiency.

In Japanese Patent Application Laid-Open No. 2009-2276A, the transmitting antenna and the receiving antenna are set on the container outer wall of the DPF filter so as to be opposed to each other, and a millimeter wave or terahertz wave is used and radiated so as to transverse the filter. The wave is thus transmitted by particulates existing within a cross section of the filter, and its transmitted amount is measured. However, when this measuring method is actually applied to the DPF filter, measurement in a plurality of sections and determination of a sum of the measurement results are required to measure the overall amount of soot accumulated in the DPF, and a complicated mechanism is needed for on-vehicle use.

An object of the present invention is to improve detection sensitivity in a device for detecting an accumulation amount of particulates trapped in a filter by use of electromagnetic wave.

The present invention comprises:

a filter for trapping particulates from a gas containing the particulates;

a container for containing the filter;

an upstream pipe provided on the upstream side of the container to lead the gas into the container;

a downstream pipe provided on the downstream side of the container to lead the gas passed through the filter;

a transmitting antenna provided within the downstream pipe to transmit an electromagnetic wave having a frequency of 30 GHz or more and 10 THz or less; and a receiving antenna provided within the upstream pipe to receive the electromagnetic wave, wherein the amount of the particulates trapped in the filter is detected based on the intensity of the electromagnetic wave received by the receiving antenna.

According to the device of the present invention, a filter for trapping particulates and a container having an inside diameter larger than the inside diameter of a pipe for leading a gas containing particulates are set, and a transmitting antenna and a receiving antenna are set within the pipe.

In this device, the transmitting antenna is set within an upstream pipe, and the receiving antenna is set within a downstream pipe. Since the container containing and setting the filter is generally larger in inside diameter than the upstream and downstream pipes and an upstream connection part thereof has a tapered structure, the transmitted electromagnetic wave spreads along the container inner wall to some degree so that the wave is effectively radiated to a wide range of the filter. Therefore, the accumulation amount of particulates in the whole filter can be accurately detected. Since a downstream connection part of the container has also a tapered structure, the electromagnetic wave is gradually confined along the container inner wall and then transferred to the receiving antenna. Therefore, the electromagnetic wave should be able to be efficiently received by the receiving antenna while minimizing the propagation loss of the electromagnetic wave.

Actually, however, when microwave is used as in Japanese Patent Application Laid-Open No. Sho 59-204747A and "Advanced DPF soot sensor presented by GE: International CTI Forum 2-4 Dec", the microwave is cut off and cannot be propagated to the receiving side. Accordingly, the method of setting the transmitting and receiving antennas within the pipe cannot be adopted.

The present inventors therefore used a millimeter wave or terahertz wave, concretely, an electromagnetic wave having a frequency of 30 GHz or more but not exceeding 10 THz. Consequently, they found that such a wave has a high absorption coefficient to soot without cut-off within the pipe, allows accurate detection with high linearity in a range of 0 g/L to 9 g/L with respect to accumulation amount, and with high sensor sensitivity up to 0.1 g/L, and further can ensure a dynamic range of 25 dB, for example, within a range of 2 to 4 g/L.

However, in the process of further research by the present inventors, the following problem was found. That is, when the transmitting antenna for transmitting the millimeter wave or terahertz wave is set within an inlet side pipe of DPF, and the receiving antenna is set within an outlet side pipe thereof, the sensitivity as sensor may be deteriorated or made insufficient depending on the accumulation amount or the filter.

As a result of research for the cause, the present inventors obtained the following knowledge. That is, when the millimeter wave or terahertz wave is transmitted with the transmitting antenna being set within the upstream pipe, the wave was effectively radiated to a wide range of the filter while spreading over from the pipe to the container to some degree. When the frequency of the electromagnetic wave is increased, the rectilinearity is enhanced and the absorption of soot is increased, so that the accumulation amount can be detected. This effect should be obtained without particular differences when receiving of electromagnetic wave is performed on the upstream side with the transmitting antenna being set within the downstream pipe.

Actually, however, it was found that the sensor sensitivity becomes higher when performing the receiving within the upstream pipe with the transmitting antenna being arranged within the downstream pipe than when performing the receiving within the downstream pipe with the transmitting antenna being arranged on the upstream side.

The reason of this phenomenon can be estimated as follows although details have not been found.

That is, in an actual diesel engine or the like, soot is deposited on the outlet side of the DPF filter, and accumulated toward the inlet side. In a form adapted to transmit the millimeter wave or terahertz wave from the transmitting antenna within the pipe as in the present invention, the pipe and the filter container function as a waveguide to electromagnetic wave. In the pipe part, the filter container wall surface and the filter, a portion without accumulation of particulates and a portion with accumulation of particulates have different propagation constants to this propagating electromagnetic wave, and reflection due to a difference in characteristic impedance is caused in an interface between such portions differed in the propagation constant.

In the case of the filter for trapping particulates, since it has a regular and periodic structure, and particulates are accumulated on the downmost stream side of the filter, the electromagnetic wave is strongly influenced by attenuation by the accumulated particulates when the electromagnetic wave is radiated to the filter with the transmitting antenna being set within the outlet pipe. The sensitivity can be consequently increased. The deterioration in sensitivity to the accumulation amount of particulates when setting the transmitting antenna within the upstream pipe is attributed to that the electromagnetic wave is attenuated first by passing through the filter having the periodic structure, and then further attenuated by passing through the particulates accumulated on the outlet side.

DETAILED DESCRIPTION OF THE INVENTION

As a transmitting element, the followings are preferred but are not limited.
(Frequency 10 Ghz to 100 Ghz)
MMIC such as GaAs or SiGe or gun diode
(50 GHz to 1 THz)
An optical multiplying system adapted to generate the above-mentioned electromagnetic wave by generating high-order optical sideband waves by an LN modulator to take out a sideband wave of a desired order, and taking out a beat signal thereof by a photomixer. In this case, a Mach-Zehnder optical modulator or phase modulator, or an integrated modulator thereof can be used as the LN modulator. When a thin plate structure described in Japanese Patent Application Laid-Open No. 2007-79466A is used as the LN modulator, but is not particularly limited, half-wavelength voltage can be reduced to generate the electromagnetic wave at low driving voltage.

Further, a PPLN (Periodically Poled Lithium Niobate) element or PPLT (Periodically Poled Lithium Tantalate) element having a domain-inverted structure (QPM: Quasi-Phase-Matching) formed thereon, and an optical waveguide (including a slab structure) element using Cherenkov radiation can be used.
(100 GHz to 10 THz)
A PPLN (Periodically Poled Lithium Niobate) element or PPLT (Periodically Poled Lithium Tantalate) element having a domain-inverted structure (QPM: Quasi-Phase Matching) formed thereon, and an optical waveguide (including a slab structure) element using Cherenkov radiation can be used.

Examples of a receiving element include, but are not limited to, a shot key diode such as GaAs, InAs or GaN, a bolometer, and an element using pyroelectric effect.

The particulates mean substances having the property of being suspended within a gas, and the particle size thereof is typically 10 nm to 10 μm but is not limited. Examples of the substances constituting the particulates include, but are not particularly limited to, PM (particulate matter) mainly composed of carbon, hydrocarbon (HC), magnetic powder such as ferrite powder, sulfate, and nitrate.

In the present invention, an electromagnetic wave having a frequency of 30 GHz or more but not exceeding 10 THz is used. By setting the frequency within this range, the electromagnetic wave propagates and diffuses along the inner wall surfaces of the pipe and the container and is thereby efficiently radiated to a wide range of the filter, so that the wave can be efficiently absorbed by the trapped particulates. Therefore, the overall sensitivity can be enhanced. From this point of view, the lower limit of the frequency of electromagnetic wave is further preferably 50 GHz, and the upper limit thereof is 3 THz, and further preferably 0.3 THz or less. The electromagnetic wave can be made less likely to be affected by the filter by collimating into parallel beams, and further high sensitive detection of the particulates can be performed.

The filter is disposed within the container through which the gas containing particulates is distributed. As the filter, a one which can transmit the electromagnetic wave used in the present invention with lower transmissivity is more suitably used. Examples of the form of the filter include a honeycomb structure and a porous structure, and the honeycomb structure is particularly preferred. The filter is preferably formed of ceramics such as cordierite, silicon nitride, alumina or silicon carbide.

Although each of the transmitting antenna and the receiving antenna is provided within each pipe in the present invention, elements for performing transmitting and receiving processing of electromagnetic wave may be provided out of the pipes.

In general, the inside diameter of the pipe is often set to, but is not limited to, 10 to 300 mm. The inside diameter (maximum value) of the container is larger than the inside diameter of the pipe. Accordingly, the electromagnetic wave used must have an electric length $\lambda c$ of cut-off or less of a pipe inside diameter Di, and the frequency of the electromagnetic wave must be thus set to a frequency fc or more ("c" is light speed).

$$fc = c/Di$$

frequency of electromagnetic wave $(c/\lambda c) \geq fc = c/Di$ $$\lambda c \leq Di$$

The inside diameter (maximum value) of the container is set preferably to 20 mm or more, and set preferably to 1000 mm or less.

The container preferably includes a storage part for storing the filter, an upstream connection part and a downstream connection part. In this case, the inside diameter of the storage part is larger than that of the pipe. It is preferred that the inside diameter of the upstream connection part is gradually reduced from the storage part toward the upstream pipe. It is also preferred that the inside diameter of the downstream connection part is gradually reduced from the storage part toward the downstream pipe.

In the present invention, the intensity of the electromagnetic wave received by the receiving antenna is detected, and the accumulation amount of particulates trapped in the filter is computed based on the intensity. Although a concrete method therefor is not limited, the accumulation amount of particulates is preferably computed by substituting an electromagnetic wave intensity detected by an electromagnetic wave receiving means to a predetermined relational expression between intensity and accumulation amount.

Since the filter itself absorbs the electromagnetic wave to some degree, the receiving intensity is preliminarily measured, as a blank, in a state in which no particulates are trapped. The accumulation amount of particulates is calculated based on a difference from the receiving intensity in a state where the particulates are trapped and an electromagnetic wave absorption coefficient.

The electromagnetic wave absorption coefficient is expressed by a logarithm of electromagnetic wave transmissivity, and the transmissivity is a ratio of outgoing output to incoming output.

In the present invention, the exhaust emission control system further comprises a reducing agent supply means for supplying a reducing agent into exhaust gas on the upstream side of the filter. The reducing agent may be directly supplied into the exhaust gas, or can be indirectly supplied to the exhaust gas by post-injecting the reducing agent into a cylinder. When the temperature of the filter is higher than the igniting temperature of the reducing agent, the reducing agent burns within the filter, and the filter is raised in temperature to, for example, 600° C. or higher by the combustion heat, whereby the filter can be regenerated. The reducing agent supply means include a pump, an injector or the like. Further, an oxidization catalyst may be disposed on the upstream side of the filter, or a catalyst layer may be formed in the filter.

When the reducing agent supply means is used, a control means is desirably provided to control the drive of the reducing agent supply means based on a detection value of accumulation amount of particulates trapped in the filter. According to this, the reducing agent supply means can be driven at an optimum time to improve the fuel efficiency.

Figure 1:
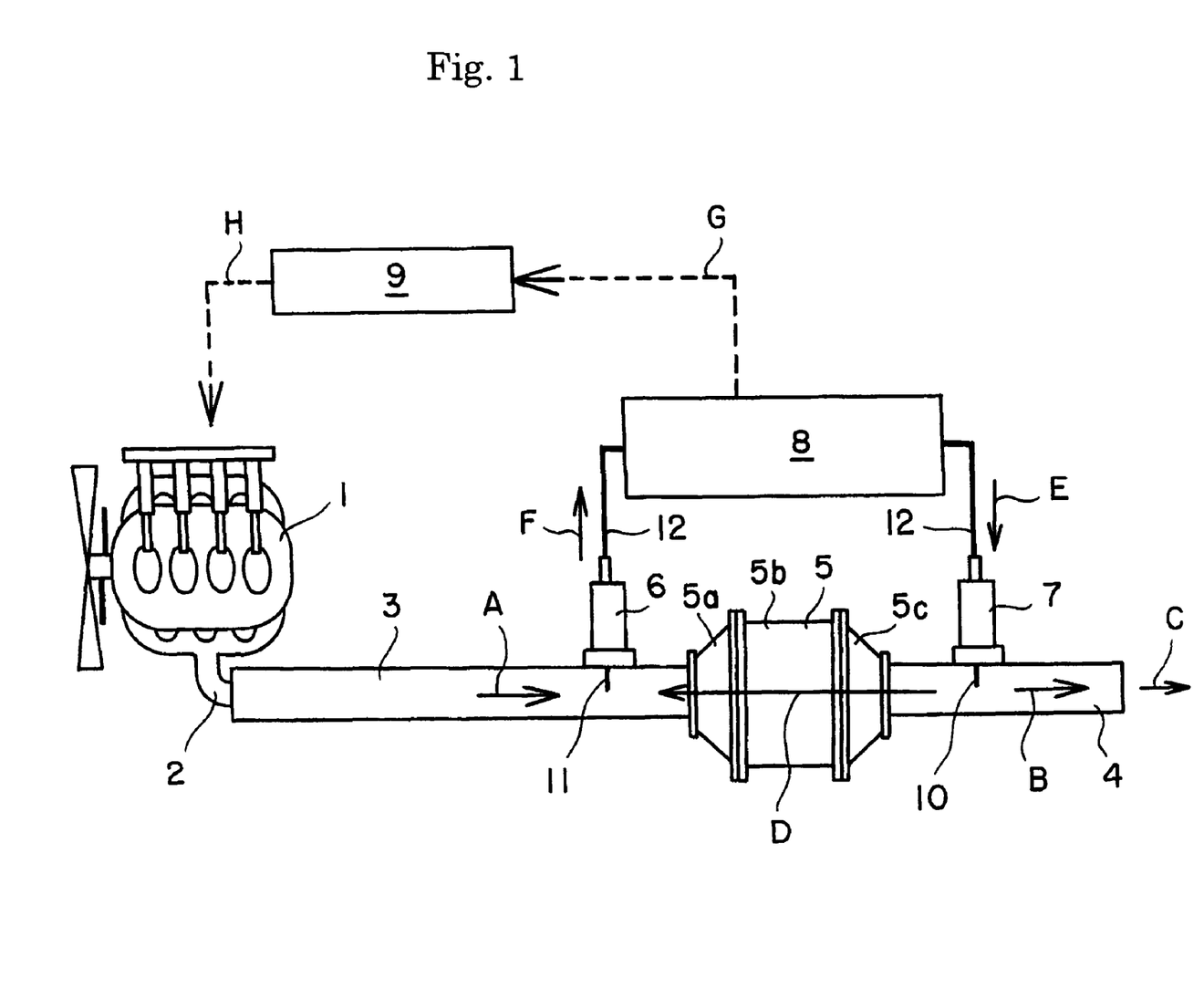
FIG. 1 is a block diagram schematically showing a device for detecting an accumulation amount of particulates according to the present invention.
Figure 2:
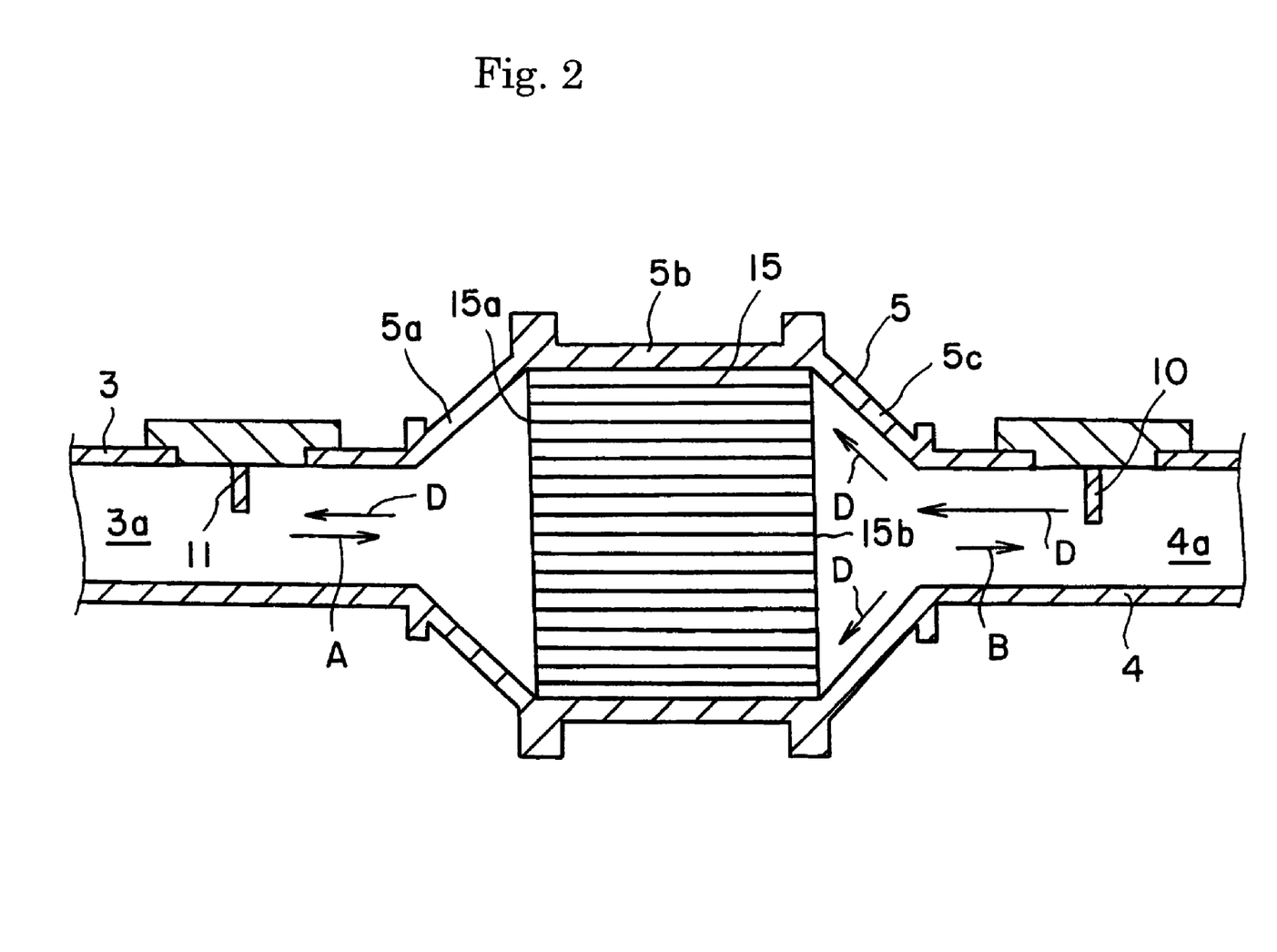
FIG. 2 is a partially enlarged cross-sectional view showing an area around a filter and a container in the device according to the present invention.

FIG. 1 schematically shows an exhaust emission control system. An exhaust pipe 2 of an exhaust manifold of a diesel engine 1 is connected to a container 5 through an upstream pipe 3. A downstream pipe 4 is provided on the downstream side of the container 5. The container 5 includes, as shown in FIG. 2, a storage part 5b with a constant inside diameter for storing a filter, an upstream connection part 5a and a downstream connection part 5c.

A filter 15 is stored within the storage part 5b of the container 5. The filter 15 is composed of a porous ceramic honeycomb structure having a number of pores regularly formed therein. A part of the pores is sealed on the exhaust gas downstream side to form inflow-side cells, and the remainder thereof is sealed on the exhaust gas upstream side to form outflow-side cells. The inflow-side cells and the outflow-side cells are formed to be alternately adjacent to each other, whereby a honeycomb-shaped wall flow structure is constituted.

A receiving antenna 11 is provided in a flow passage 3a of the upstream pipe 3 and connected to a receiving element part 6 disposed out of the pipe. A transmitting antenna 10 is provided in a flow passage 4a of the downstream pipe 4 and connected to a transmitting element part 7 mounted out of the pipe. The element parts 6 and 7 are connected to a control part 8 through wires 12.

Exhaust gas from the engine 1 flows in the upstream pipe 3 as shown by arrow A to enter into the container 5, in which it passes the filter 15 from an upstream end surface 15a, then flows in the flow passage 4a of the downstream pipe 4, and discharges out as shown by arrow C. Particulates are trapped and accumulated in the filter 15.

When the electromagnetic wave is transmitted, as shown by arrow D, from the transmitting antenna 10 within the flow passage 4a of the downstream pipe in response to a signal E from the control device 8 in accordance with the present invention, the electromagnetic wave propagates along the inner wall surface of the pipe 4 and the inner wall surface of the downstream connection part 5c, so that the wave is extensively radiated to a downstream end surface 15b of the filter 15. The electromagnetic wave is subjected to absorption attenuation by the filter material and the particulates within the filter 15, propagated into the flow passage 3a of the upstream pipe 3 as shown by arrow D, and received by the receiving antenna 11.

A receiving signal thereof is transmitted to the control part 8 as shown by arrow F. The control part 8 processes the receiving signal and transmits information for transmitted electromagnetic wave and information for received electromagnetic wave to an arithmetic unit 9 as shown by arrow G. The arithmetic unit 9 compares the information for transmitted electromagnetic wave, e.g., the intensity, with the information for received electromagnetic wave, e.g., the intensity, and computes an accumulation amount in reference to information for a calibration curve showing a relationship between the electromagnetic wave intensity and the accumulation amount.

The computing result of accumulation amount is outputted as shown by arrow H so as to be usable. For example, cleaning of the filter 5 or output of a replacement signal for the filter can be performed when the accumulation amount exceeds a threshold value.

Figure 3:
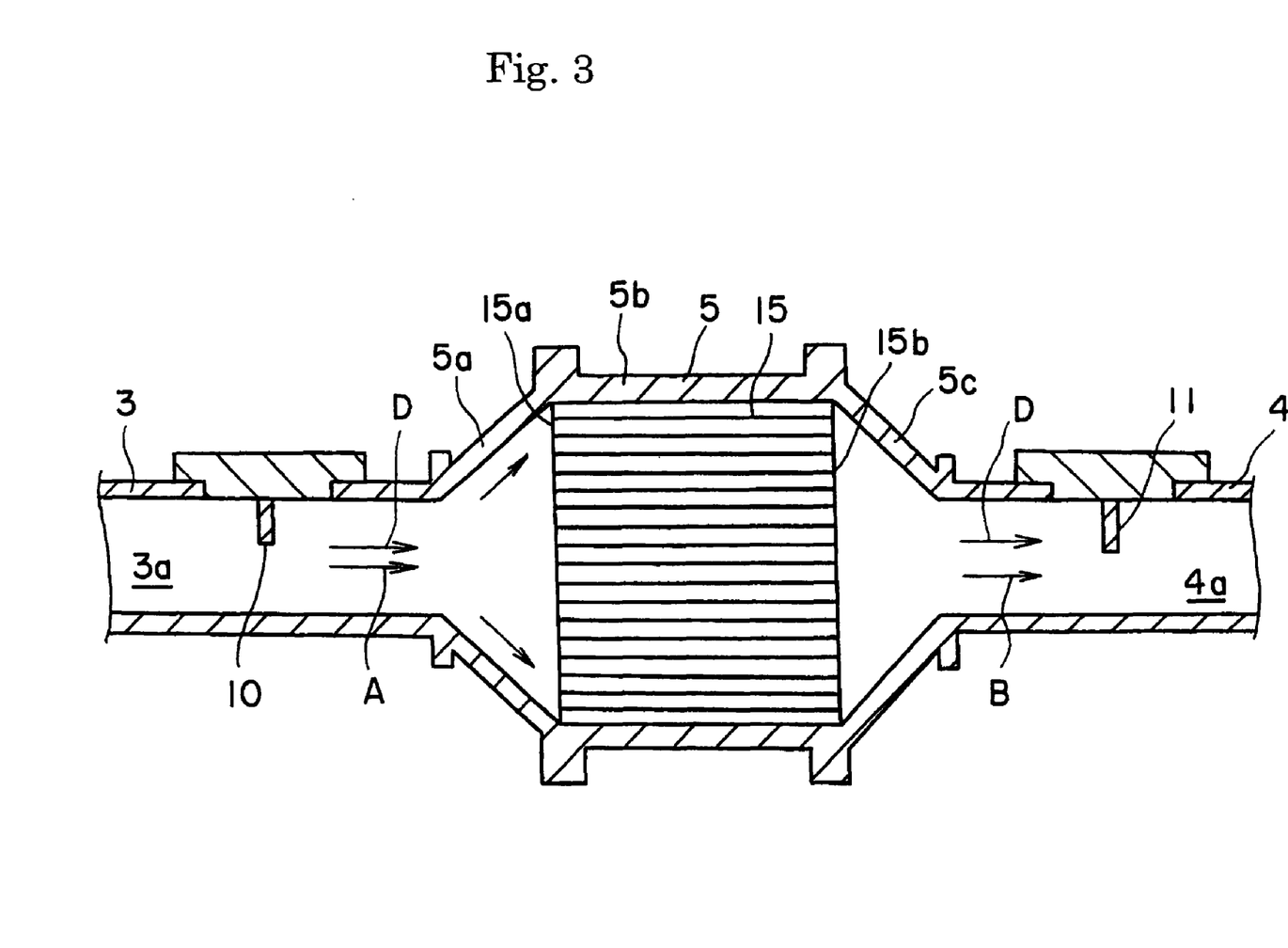
FIG. 3 is a partially enlarged cross-sectional view showing an area around a filter and a container in a device according to a comparison example.

When the transmitting antenna 10 is set in the flow passage 3a of the upstream pipe 3, and the receiving antenna 11 is set in the flow passage 4a of the downstream pipe 4 as shown in FIG. 3, electromagnetic wave D is considered to be subjected to absorption by the particulates accumulated on the downstream side of the filter 15 after it is already attenuated by passing through the regular and periodic structure having many voids on the upstream side of the filter 15.

In the present invention, when the electromagnetic wave is radiated to the filter with the transmitting antenna 10 being set within the downstream pipe 4 as shown in FIG. 2, the electromagnetic wave is strongly influenced by the attenuation by the particulates accumulated on the downstream side of the filter 15, and this probably results in enhanced sensitivity.

Figure 4:
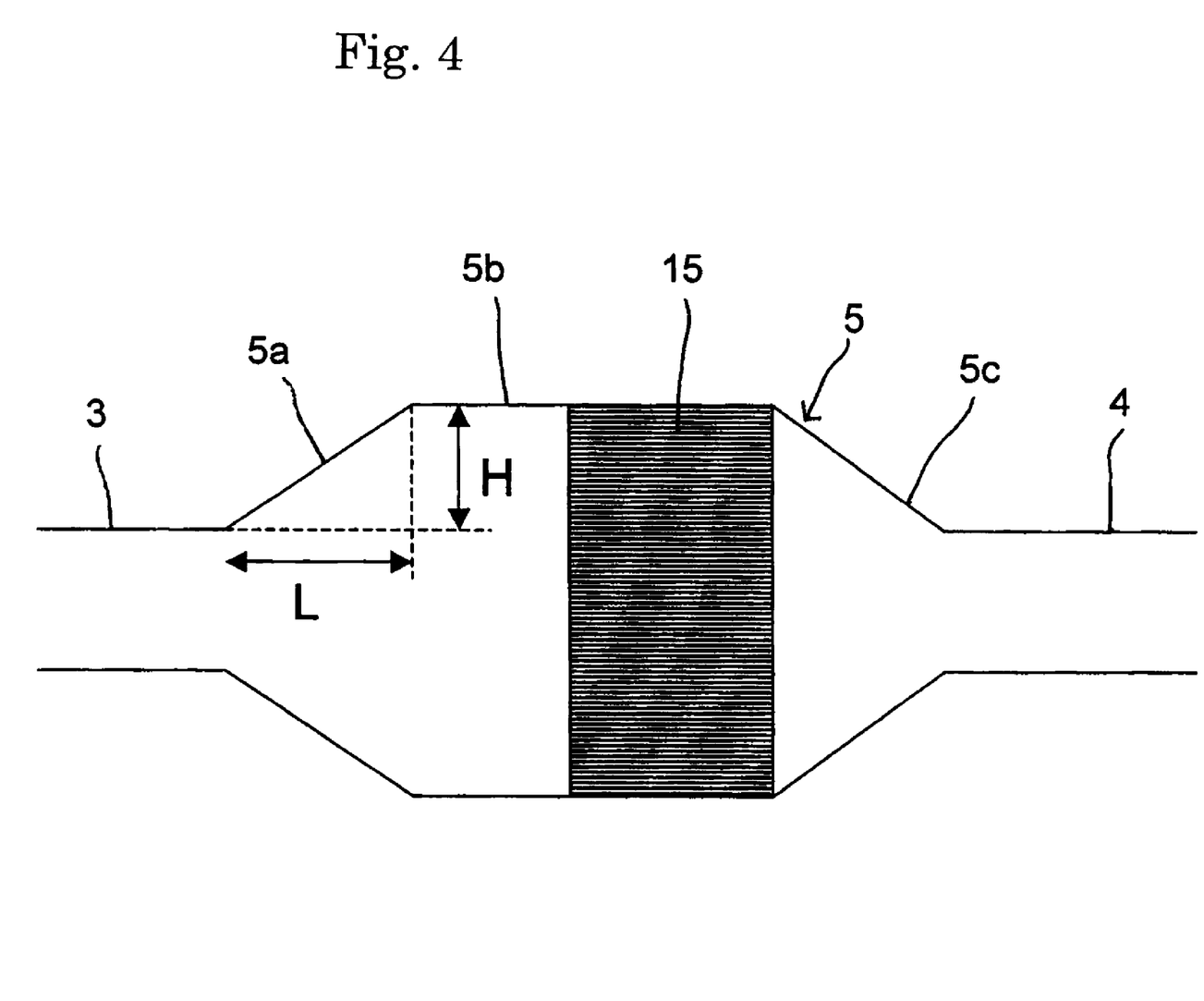
FIG. 4 is a view schematically showing a dimensional relationship in a container 5.

As shown in FIG. 4, the length L of the upstream connection part 5a and the length L of the downstream connection part 5c are preferably not less than two times of the wavelength $\lambda$ of the electromagnetic wave. The difference H between the internal radius of the upstream pipe 3 or the downstream pipe 4 and the internal radius of the storage part 5b of the container 5 is preferably L×$\lambda$ or less. When this condition is satisfied, the electromagnetic wave sufficiently spreads at the transmitting-side connection part, and transmission and receiving can be performed with high efficiency and low loss without propagation loss at the receiving-side connection part.

EXAMPLES

Example 1

The device described in reference to FIGS. 1 and 2 was manufactured and subjected to measurement experiment. The internal radius of the upstream pipe was 100 mm, the internal radius of the storage part 5b of the container 5 was 158 mm, and the internal radius of the downstream pipe 4 was 100 mm. The length L of each of the upstream connection part 5a and the downstream connection part 5c was 50 mm.

The filter 15 used had a cell density of 300 cpsi, and was made of cortherite with a dimension of $\phi$6 inch×length 150 mm.

Figure 5:
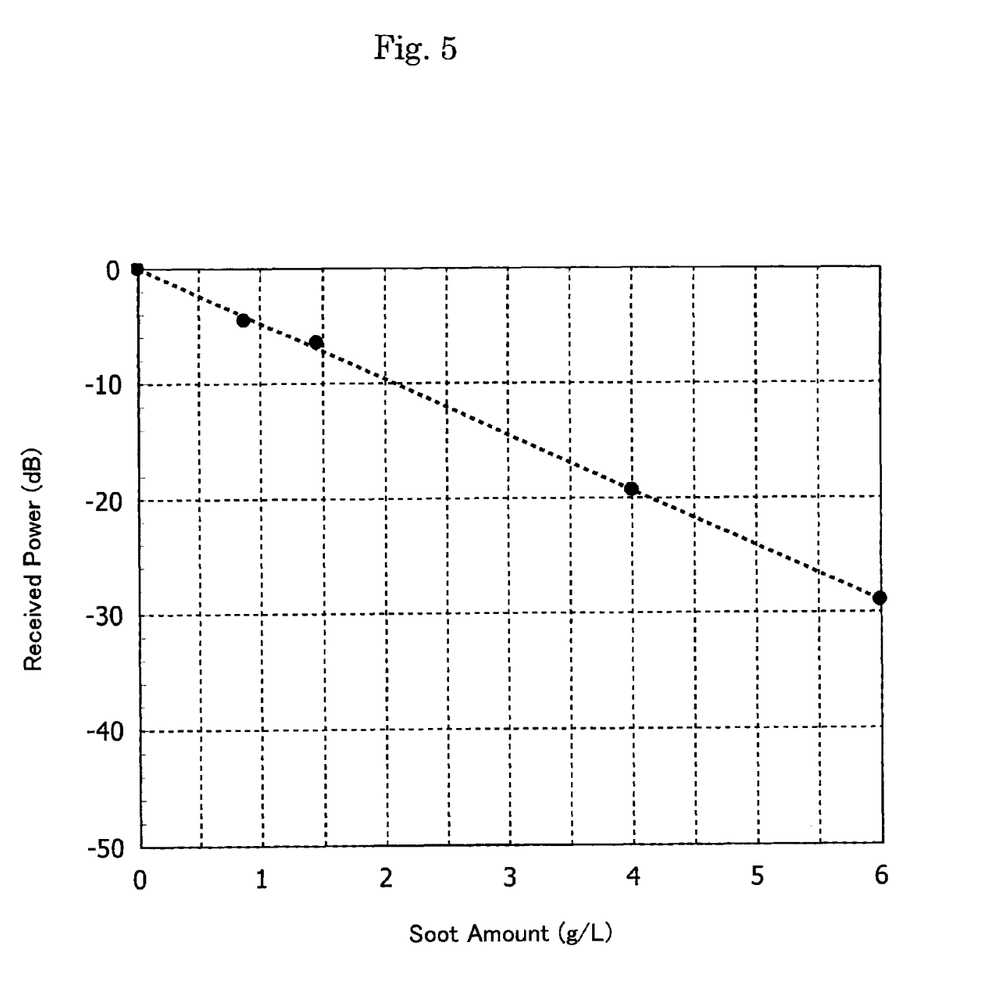
FIG. 5 is a graph showing a relationship between soot accumulation amount and receiving intensity in Example 1.

The frequency of the electromagnetic wave D to be radiated was 100 GHz, and the soot accumulation amount of the filter was changed to 0, 0.86, 1.45, 4, and 6 g/L. The measurement result of receiving intensity of electromagnetic wave is shown in FIG. 5. This result shows that the inclination of accumulation amount and receiving intensity is constant, and the accumulation amount can be calculated by monitoring the receiving intensity by the above-mentioned computing method.

Comparative Example 1

The device as a comparative example described in reference to FIGS. 1 and 3 was manufactured and subjected to measurement experiment. The internal radius of the upstream pipe 3 was 100 mm, the internal radius of the storage part 5b of the container 5 was 158 mm, and the internal radius of the downstream pipe 4 was 100 mm. The length L of each of the upstream connection part 5a and the downstream connection part 5c was 50 mm.

The filter 15 used had a cell density of 300 cpsi, and was made of cordierite with a dimension of $\phi$6 inch×length 150 mm. The frequency of the electromagnetic wave D to be radiated was 100 GHz.

The measurement of accumulation amount was performed by variously changing the accumulation amount in the filter similarly to Example 1. As a result, the receiving intensity was reduced by 3 dB, compared with Example 1.

Example 2

In the structure shown in FIGS. 1 and 2, measurement of change in receiving intensity was performed by changing the connection part length L and the difference H in inside diameter between the pipe and the container. The electromagnetic wave frequency λ was 100 GHz (wavelength 3 mm). In this case, the inside diameter of the pipe was 100 mm, and the filter diameter in the container was smaller by 5 mm than the container inside diameter.

The result is shown in Table 1. The excessive loss of electromagnetic wave represents a loss with respect to the measurement result in L=2×λ and H=L×λ. The condition of L≧2λ is satisfied when L is 6 mm or larger. This result shows that the electromagnetic wave is free from excessive loss, when the connection part length L is more than double of the wavelength λ of the electromagnetic wave and the internal radius difference H is L×λ or less.

TABLE 1

|  | H = 10 mm | H = 18 mm | H = 30 mm | H = 50 mm | H = 65 mm | H = 160 mm |
|---|---|---|---|---|---|---|
| L = 5 mm | 2 dB | 2 dB | 4 dB | 4 dB | 7 dB | 10 dB |
| L = 6 mm | 0 dB | 0 dB | 3 dB | 3 dB | 5 dB | 7 dB |
| L = 20 mm | 0 dB | 0 dB | 0 dB | 0 dB | 2 dB | 3 dB |
| L = 50 mm | 0 dB | 0 dB | 0 dB | 0 dB | 0 dB | 2 dB |

| | |
|---|---|
| 1 | Engine |
| 3 | Upstream pipe |
| 4 | Downstream pipe |
| 5 | Container |
| 5a | Upstream connection part |
| 5b | Storage part |
| 5c | Downstream connection part |
| 6 | Receiving element part |
| 7 | Transmitting element part |
| 8 | Control part |
| 9 | Arithmetic part |
| 10 | Transmitting antenna |
| 11 | Receiving antenna |
| A, C | Flow of exhaust gas |
| D | Electromagnetic wave |

The invention claimed is:

1. A device for detecting an accumulation amount of particulates, the device comprising:
    a filter trapping particulates from a gas containing the particulates;
    a container containing the filter;
    an upstream pipe, having an inside diameter, provided on the upstream side of the container to lead the gas into the container;
    a downstream pipe, having an inside diameter, provided on the downstream side of the container to lead the gas after the gas passed through the filter;
    a transmitting antenna provided within the downstream pipe to transmit an electromagnetic wave having a frequency of 30 GHz or more and 10 THz or less,
    wherein the frequency of the electromagnetic wave is equal to or greater than a ratio c/Di, where c is equal to the speed of light and Di is equal to the inside diameter of the upstream and downstream pipes; and
    a receiving antenna provided within the upstream pipe to receive the electromagnetic wave,
    wherein an amount of the particulates trapped in the filter is detected based on an intensity of the electromagnetic wave received by the receiving antenna.

2. The device of claim 1, wherein the container comprises a storage part for storing the filter, an upstream connection part connecting the storage part to the upstream pipe and a downstream connection part connecting the storage part to the downstream pipe, and wherein an inside diameter of the downstream connection part is reduced from the storage part toward the downstream pipe.

3. The device of claim 2, wherein an inside diameter of the upstream connection part is reduced from the storage part toward the upstream pipe.

4. The device of claim 2, wherein a length L of each of the upstream connection part and the downstream connection part is not less than two times of the wavelength λ of the electromagnetic wave, and wherein a difference H between an internal radius of the pipe and an internal radius of the storage part is L×λ or less.

5. The device of claim 1, wherein the particulates comprises particulate matter.

* * * * *